(12) United States Patent
Doolittle et al.

(10) Patent No.: US 8,181,183 B2
(45) Date of Patent: May 15, 2012

(54) METHOD, SYSTEM AND PROGRAM PRODUCTS FOR MANAGING THREAD POOLS OF A COMPUTING ENVIRONMENT TO AVOID DEADLOCK SITUATIONS

(75) Inventors: Gregory David Doolittle, Vestal, NY (US); Timothy Peter Krein, Endicott, NY (US); Scott Thomas Marcotte, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 1846 days.

(21) Appl. No.: 11/071,487

(22) Filed: Mar. 3, 2005

(65) Prior Publication Data

US 2005/0149934 A1    Jul. 7, 2005

Related U.S. Application Data

(62) Division of application No. 09/443,202, filed on Nov. 18, 1999, now Pat. No. 6,898,617.

(51) Int. Cl.
*G06F 9/46* (2006.01)
*G06F 15/173* (2006.01)
*G06F 15/16* (2006.01)

(52) U.S. Cl. .......................... 718/104; 709/226; 709/229

(58) Field of Classification Search .......................... None
See application file for complete search history.

(56) References Cited

U.S. PATENT DOCUMENTS

| | | | |
|---|---|---|---|
| 5,175,852 A | 12/1992 | Johnson et al. | 395/600 |
| 5,202,971 A | 4/1993 | Henson et al. | 395/425 |
| 5,590,335 A | 12/1996 | Dubourreau et al. | |
| 5,634,122 A | 5/1997 | Loucks et al. | 395/608 |
| 5,689,706 A | 11/1997 | Rao et al. | 395/617 |
| 5,692,193 A | 11/1997 | Jagannathan et al. | |
| 5,740,448 A | 4/1998 | Gentry et al. | 395/726 |
| 5,892,954 A | 4/1999 | Tomas et al. | 395/726 |
| 5,893,086 A | 4/1999 | Schmuck et al. | 701/1 |
| 5,941,970 A * | 8/1999 | Lange | 710/314 |
| 5,951,653 A | 9/1999 | Hill et al. | |
| 5,968,167 A | 10/1999 | Whittaker et al. | |
| 5,991,790 A | 11/1999 | Shah et al. | |
| 5,995,998 A | 11/1999 | Furlani et al. | |
| 6,092,163 A | 7/2000 | Kyler et al. | |
| 6,125,382 A | 9/2000 | Brobst et al. | |
| 6,134,594 A * | 10/2000 | Helland et al. | 709/229 |
| 6,167,423 A | 12/2000 | Chopra et al. | |

(Continued)

OTHER PUBLICATIONS

"Establishing Distributed File System Access to MVS Host Files," IBM Technical Disclosure Bulletin, vol. 38, No. 04, Apr. 1995, pp. 39-40.

(Continued)

*Primary Examiner* — Camquy Truong
(74) *Attorney, Agent, or Firm* — Dennis Jung, Esq; Kevin P. Radigan, Esq; Heslin Rothenberg Farley & Mesiti P.C.

(57) ABSTRACT

Deadlock situations within a computing environment are avoided by properly managing pools of threads used to service requests of the computing environment. When a server of the computing environment receives a request to be processed and that request is waiting on a response from a client of the computing environment, the set of eligible thread pools for the response is dynamically altered. This dynamic altering allows the response to be serviced by a thread pool different from the thread pool servicing the request, thereby avoiding a deadlock situation.

18 Claims, 8 Drawing Sheets

U.S. PATENT DOCUMENTS

| | | | |
|---|---|---|---|
| 6,173,442 | B1 | 1/2001 | Agesen et al. |
| 6,182,109 | B1 | 1/2001 | Sharma et al. |
| 6,205,465 | B1 | 3/2001 | Schoening et al. |
| 6,219,690 | B1 | 4/2001 | Slingwine et al. |
| 6,223,207 | B1 | 4/2001 | Lucovsky et al. |
| 6,272,518 | B1 | 8/2001 | Blazo et al. |
| 6,345,242 | B1 | 2/2002 | Dearth et al. |
| 6,385,701 | B1 | 5/2002 | Krein et al. |
| 6,393,458 | B1 | 5/2002 | Gigliotti et al. |
| 6,393,477 | B1 | 5/2002 | Paxhia et al. |
| 6,418,458 | B1 * | 7/2002 | Maresco ............ 718/103 |
| 6,453,356 | B1 | 9/2002 | Sheard et al. |
| 6,463,480 | B2 | 10/2002 | Kikuchi et al. |
| 6,477,561 | B1 | 11/2002 | Robsman |
| 6,535,878 | B1 | 3/2003 | Guedalia et al. |
| 6,542,920 | B1 * | 4/2003 | Belkin et al. ............ 718/104 |
| 6,631,009 | B1 | 10/2003 | Thomas et al. |
| 6,671,259 | B1 * | 12/2003 | He et al. ............ 370/238 |
| 6,684,262 | B1 | 1/2004 | Miller et al. |
| 6,898,617 | B2 | 5/2005 | Doolittle et al. |

OTHER PUBLICATIONS

"Method for Protecting Request Atomicity in Multi-Writer Distributed Environment," IBM Technical Disclosure Bulletin, vol. 38, No. 12, Dec. 1995, pp. 227-228.

"Enterprise Systems Architecture/390: Principles of Operation", IBM Publication No. SA22-7201-04 (Jun. 1997).

Office Action issued for U.S. Appl. No. 09/443,202 (U.S. Letters Patent No. 6,898,617 B2), dated Jun. 5, 2002.

Office Action issued for U.S. Appl. No. 09/443,202 (U.S. Letters Patent No. 6,898,617 B2), dated Feb. 21, 2003.

Office Action issued for U.S. Appl. No. 09/443,202 (U.S. Letters Patent No. 6,898,617 B2), dated Nov. 20, 2003.

Office Action issued for U.S. Appl. No. 09/443,202 (U.S. Letters Patent No. 6,898,617 B2), dated Apr. 5, 2004.

* cited by examiner

METHOD, SYSTEM AND PROGRAM PRODUCTS FOR MANAGING THREAD POOLS OF A COMPUTING ENVIRONMENT TO AVOID DEADLOCK SITUATIONS

This application is a divisional of Ser. No. 09/443,202 filed on Nov. 18, 1999 now U.S. Pat. No. 6,898,617.

TECHNICAL FIELD

This invention relates, in general, to processing requests within a computing environment, and in particular, to ensuring that a pool of threads is available to process the requests, such that a deadlock situation is avoided.

BACKGROUND ART

In various computing environments, a request by one requester (e.g., a client) for a resource cannot be satisfied until control of that resource is relinquished by a previous requester. One such computing environment is the Distributed File System (DFS) offered by International Business Machines Corporation (IBM).

The DFS product, which supports Server Message Block (SMB) clients, is used by, for example, the OS/390 operating system of IBM to provide a file serving protocol. DFS and specifically, SMB (also known as Common Internet File System (CIFS)), allows clients to cache data via a form of locking, called an opportunistic lock (oplock). An oplock is requested on the file open SMB request and the server grants an oplock depending on whether other clients have the file open at the same time or not. If a client has an oplock, then that client can cache file data and/or byte range lock requests for that file, and can perform read-ahead and write-behind optimizations.

Oplocks are broken by the server when another client attempts to open the file or when another client requests an operation that might change the file, such as a rename or delete. In these cases, the server sends a callback to the client (called an oplock break) that tells the client it lost its oplock. The client responds either with a file close SMB or an oplock break notification via a lockingX SMB. However, if the client has dirty data or cached byte range locks, it is allowed to flush the data and obtain byte range locks before it closes the file or sends the break notification via the lockingX SMB. The client request (or requests) that forced the server to break the other client's oplock is made to wait for the oplock notification or file close from the original client that held the oplock.

Since any client request could possibly wait for a callback and response from one or more clients, there must be processing threads available to handle the callback response(s) from the client(s) holding the oplock or a deadlock could occur. A single thread pool, no matter what the size, cannot solve the problem. For example, assume that Client A currently has a hold (e.g., an oplock or a token) on Resource X (e.g., a file) and is currently updating Resource X. Then, Client B requests that resource. The server breaks the oplock for Resource X, even though Client A is not done updating Resource X. Eventually, Client A sends a response to the callback; however, there may be no threads in the thread pool to handle the response, since all of the threads are already processing client requests that are waiting for the callback response from Client A.

At least two approaches have been taken in an attempt to avoid the above deadlock situation. One approach is referred to as the single pool approach. With the single pool approach, when a thread is to wait for an oplock response, rather than blocking the thread, the thread is made available to process other requests. Hence, the state of the in-progress operation is saved and the thread is made available to process another request, including an oplock break response. Thus, with this approach, the state must be maintained for each operation. Further, to make a thread available again for processing requires that each routine called up to the point where it has detected an oplock break is needed, would have to be prepared for a special return code from its callers to see if the operation was completed or was simply placed on hold due to an oplock break response, and each routine would have to return to its caller to collapse the program stack on the thread to make it available.

This approach increases the complexity of the code that processes the individual SMBs and also adds increased path length, since many routines in the path would have to update a state block and also check upon the return of a called routine to determine whether the request was processed or whether it was queued waiting on an oplock break response. Hence, this approach is considered expensive and a degradation of system performance.

Another approach is a dual pool approach. With this approach, a primary thread pool handles any client requests, while a secondary thread pool only handles requests that could not possibly block waiting to obtain a hold on a resource. Hence, the secondary pool handles requests that were guaranteed not to wait on resources, such as requests to store back data or release resources. For this approach, the client indicated on the request whether it was eligible for the secondary pool or not. Thus, it was the responsibility of the client software to provide an indication of what thread pool was to be used by the server and to provide this indication in the request itself.

The dual thread pool scheme avoids deadlock without the expense of implementation or performance degradation of the single pool scheme. However, the problem with the dual pool approach is that client software is required to indicate which thread pools are eligible for the server to use on an individual request basis. Thus, special client software is needed, which results in extra administrative expense to customers.

Based on the foregoing, a need still exists for an approach to avoid deadlocks, which is more efficient, simpler and less expensive than previous approaches, and does not require additional or special client software. A further need exists for an approach that enables the dynamic assignment of thread pools.

SUMMARY OF THE INVENTION

The shortcomings of the prior art are overcome and additional advantages are provided through the provision of a method of managing thread pools of a computing environment. In one embodiment, the method includes receiving from a first requester of the computing environment a request to be processed, wherein the request is waiting on a response from a second requester of the computing environment, and wherein the response is to be serviced by a thread pool selected from a set of one or more eligible thread pools; and dynamically altering the set of one or more eligible thread pools to provide an altered thread pool set of one or more eligible thread pools, wherein a thread pool of the altered thread pool set is to service the request.

In one example, the dynamic altering is initiated, when it is determined that the request is waiting for the response.

In another example, the first requester and the second requester are the same requester. Further, in yet another example, the first requester and the second requester are different requesters.

In a further aspect of the present invention, the response is dispatched on a thread of the thread pool. Further, the method includes determining whether the thread pool is appropriate for the dispatched response, and when the thread pool is inappropriate, redispatching the response onto another thread pool.

In yet a further embodiment, the method includes dynamically re-altering the altered thread pool set to service one or more other responses or one or more other requests.

In yet a further aspect of the present invention, a method of managing thread pools of a computing environment is provided. The method includes, for instance, dynamically determining which thread pool of a plurality of thread pools is to be used to process a request; and processing the request using a thread of the thread pool.

Systems and computer program products corresponding to the above-summarized methods are also described and claimed herein.

Advantageously, the present invention provides a thread pool management capability that ensures the avoidance of deadlock situations when a client is waiting on a response from one or more other clients or the same client. This capability does not incur the development expense or suffer from the performance degradation of a single pool solution, and does not require the special client software of previous dual pool approaches.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with one aspect of the present invention, the set of thread pools eligible for servicing an outstanding request is dynamically determined and/or altered. This set of pools can be determined and/or altered without cancelling the outstanding request and without requiring an extra dispatch of the request. As one example, this capability is used to avoid deadlock situations, when, for instance, one client request cannot be processed until it receives a response (e.g., a callback response) from one or more other clients (or the same client). As used herein, the term client includes, at the very least, a local client, a remote client and/or a local user, as examples.

Figure 1:
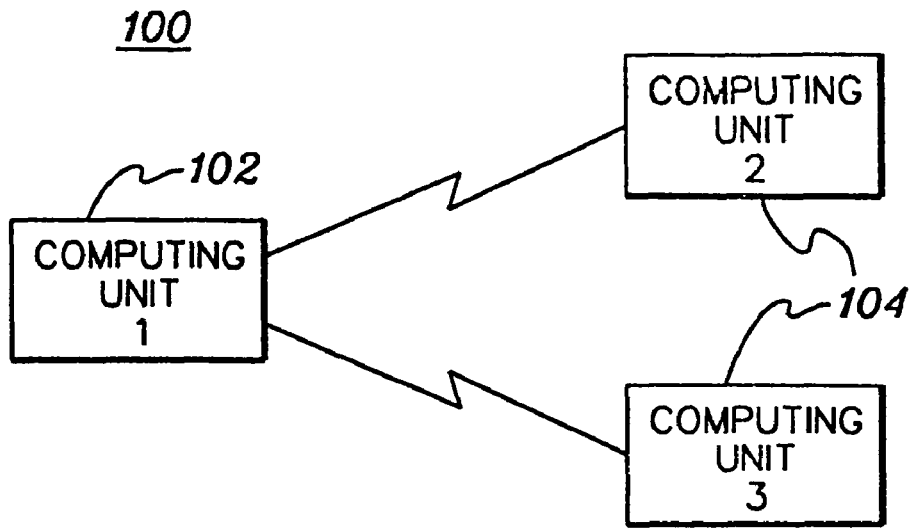
FIG. 1 depicts one example of a computing environment incorporating and using the capabilities of the present invention.

One embodiment of a computing environment incorporating and using the capabilities of the present invention is described with reference to FIG. 1. A computing environment 100 includes, for instance, at least one computing unit 102 coupled to one or more other computing units 104. In one example, computing unit 102 is a server, while computing units 104 are clients. Each unit includes, for example, one or more central processing units, memory and one or more input/output devices, as is well known in the art.

Computing unit 102 is based, for instance, on the Enterprise Systems Architecture (ESA)/390 offered by International Business Machines Corporation, Armonk, N.Y. ESA/390 is described in an IBM Publication entitled "Enterprise Systems Architecture/390 Principles of Operation," IBM Publication No. SA22-7201-04, June 1997, which is hereby incorporated herein by reference in its entirety. One example of a computing unit based on ESA/390 is the 9672 Parallel Enterprise Server offered by International Business Machines Corporation.

One or more of computing units 104 are personal computers. As one example, a computing unit 104 is a personal computer executing Microsoft Windows, which runs on the Intel PC architecture.

Computing unit 102 is coupled to one or more of computing units 104 via a standard connection, such as any type of wire connection, token ring or network connection, to name just a few examples. One communications protocol used by one or more of these connections is TCP/IP.

The above-described computing environment and/or computing units are only offered as examples. The present invention can be incorporated and used within many types of computing units, computers, processors, nodes, systems, workstations and/or environments without departing from the spirit of the present invention. For example, one or more of the units may be based on the Unix architecture or may include the Intel PC architecture. Additionally, while some of the embodiments described herein are discussed in relation to servers and clients, and in particular, to a file server and clients, such embodiments are only examples. Other types of receivers and requesters of information, other types of servers and other types of computing environments can benefit from the present invention and are thus, considered a part of the present invention.

Additionally, the clients need not be remote from the server. The invention is equally applicable to clients and servers running on the same physical machine, different physical machines or any combination thereof.

Figure 2:
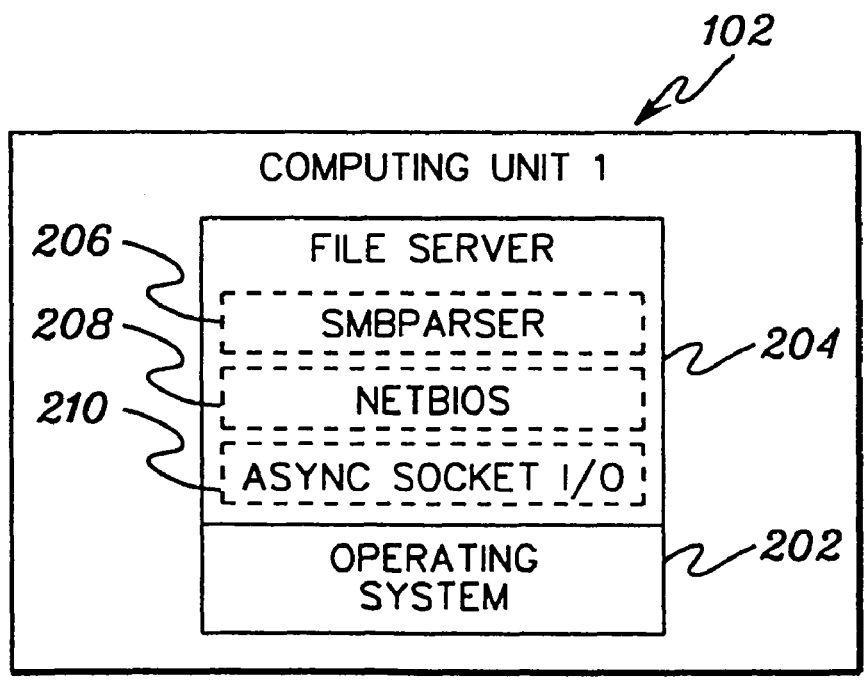
FIG. 2 depicts a more detailed embodiment of various components of one of the computing units of FIG. 1, in accordance with the principles of the present invention.

Further details of computing unit 102 are described with reference to FIG. 2. As one example, computing unit 102 includes an operating system 202, such as the OS/390 or MVS Operating System offered by International Business Machines Corporation. Running on the operating system is, for instance, a file server 204. File server 204 includes a plurality of layers, such as, for example, an SMBparser layer 206, a Netbios layer 208 and an Asynchronous socket I/O layer 210.

SMBparser layer 206 is the main SMB processing layer that knows the state of the environment relative to the client (e.g., what files are opened, what callbacks are in progress, etc.). When this layer is called, the client session is in a stopped state. Thus, no more requests are received from the client, while it is in this state. The lowest SMB layers call Netbios to re-enable the session, after performing some preliminary processing.

Netbios layer 208 is responsible for maintaining communications between the server and the clients. It is a conduit between the SMBparser layer and the Asynchronous sockets layer. Netbios schedules the asynchronous receive requests, described below, on behalf of the SMBparser. For example, SMBs are packaged in Netbios packets and Netbios makes the asynchronous socket calls on behalf of the SMBparser layer, which performs the work.

Async sockets I/O layer 210 provides the low level socket communications that maintain the thread pools used in processing client requests. In one example, the Async sockets layer uses the POSIX (Portable Operating System Interface for Computer Environments) Asynchronous IO interface to handle communications.

Figure 3A:
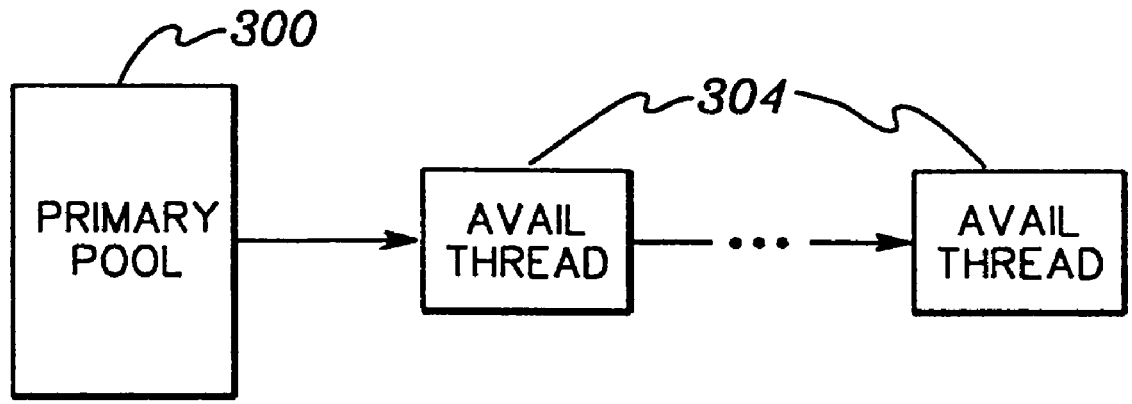
FIG. 3a depicts one example of a primary pool used in accordance with the principles of the present invention.
Figure 3B:
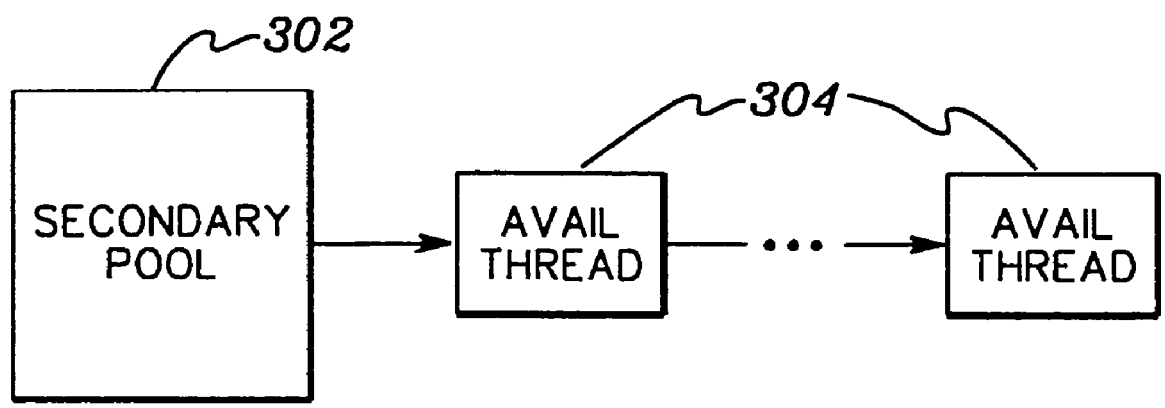
FIG. 3b depicts one embodiment of a secondary pool used in accordance with the principles of the present invention.

Each of the layers is aware that there are a plurality of thread pools to be managed. As one example, the plurality of thread pools includes a primary thread pool 300 (FIG. 3*a*) and a secondary thread pool 302 (FIG. 3*b*). Each thread pool includes zero or more available threads 304 to be used by the server in processing an incoming client request. In one example, the available threads are stored in a last in/first out (LIFO) order. (In another embodiment, there may be a plurality of primary pools and/or a plurality of secondary pools.)

When a client sends a request to a server to be processed, the server obtains an available thread from a selected thread pool in order to process the request. The selected pool is chosen from a set of eligible thread pools, and, in accordance with one aspect of the present invention, the set is dynamically managed, in order to avoid deadlock situations, as described below.

Figure 4A:
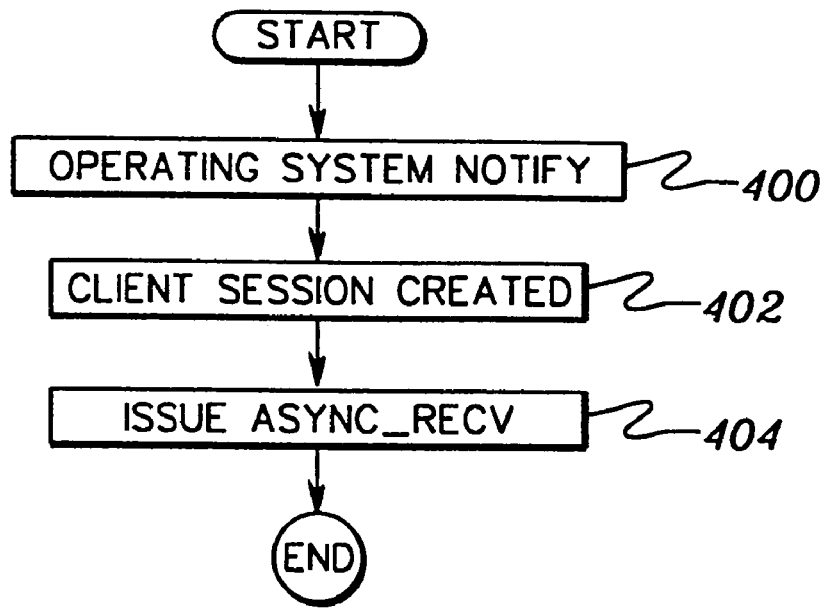
FIG. 4a depicts one embodiment of the logic associated with creating a client session, in accordance with the principles of the present invention.
Figure 4B:
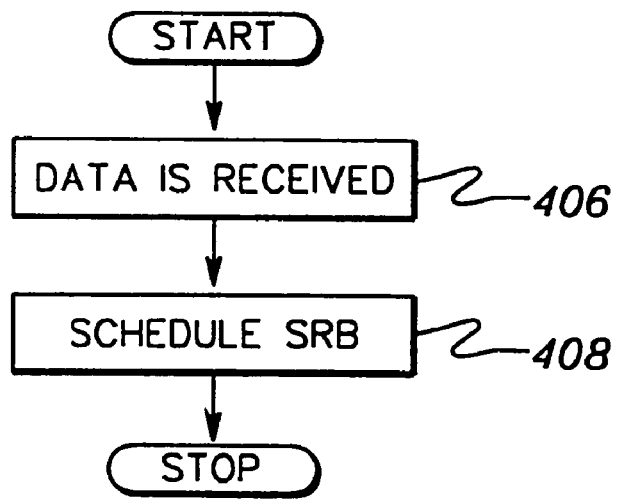
FIG. 4b depicts one embodiment of the logic associated with receiving a request, in accordance with the principles of the present invention.

One embodiment of the logic used to process requests of a client is described with reference to FIGS. 4*a*-4*d*. In particular, FIG. 4*a* describes one embodiment of the logic used to create a client session; FIG. 4*b* describes one embodiment of the logic used to schedule the request; and FIGS. 4*c*-4*d* describe one embodiment of the logic used to process the request.

Before a client communicates with a server, a client session is created, as described with reference to FIG. 4*a*. Initially, the operating system notifies the file server of a new client session that has been dispatched on a thread pool, such as the primary thread pool, STEP 400 (FIG. 4*a*).

Figure 5:
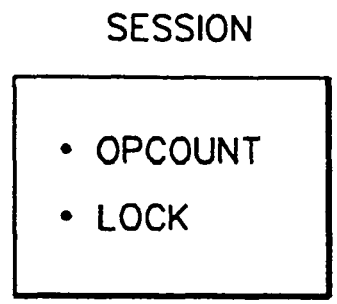
FIG. 5 depicts one embodiment of a session data structure associated with a client, in accordance with the principles of the present invention.

Thereafter, the new client session is created, STEP 402. In particular, each client session is represented by a session data structure, which is used to store information relating to the particular client session. In one example, a session structure 500 (FIG. 5) includes an opportunistic lock (oplock) count indicating the number of outstanding oplocks for the client. This information is employed, for instance, to determine the set of eligible pools to be used to process a request. For example, if the count is zero, then the set of pools includes only the primary pool. However, a count greater than zero indicates that at least one other pool (e.g., a secondary pool) is also to be used to process the client requests. The session structure also includes a lock used for serialization, as described below.

Returning to FIG. 4*a*, after a client session is established, an asynchronous receive (async_recv) function is issued to allow notification of when a client request arrives at the server, STEP 404. In one example, it is Netbios that asynchronously schedules the request for the receipt of the data. The asynchronous receive call includes a pool mask indicating the allowable pools to be used to dispatch the work thereon. In one example, this pool mask is set dynamically (i.e., without human intervention and/or without the use of client code) using a setpoolmask function, which is described in further detail below. Since this pool mask is being set at the start of a client session, the pool mask is initially set to one pool (e.g., the primary pool). Thus, the asynchronous receive function allows the efficient specification of allowable thread pools to be used when the next data request comes in from the associated client.

Figure 6:
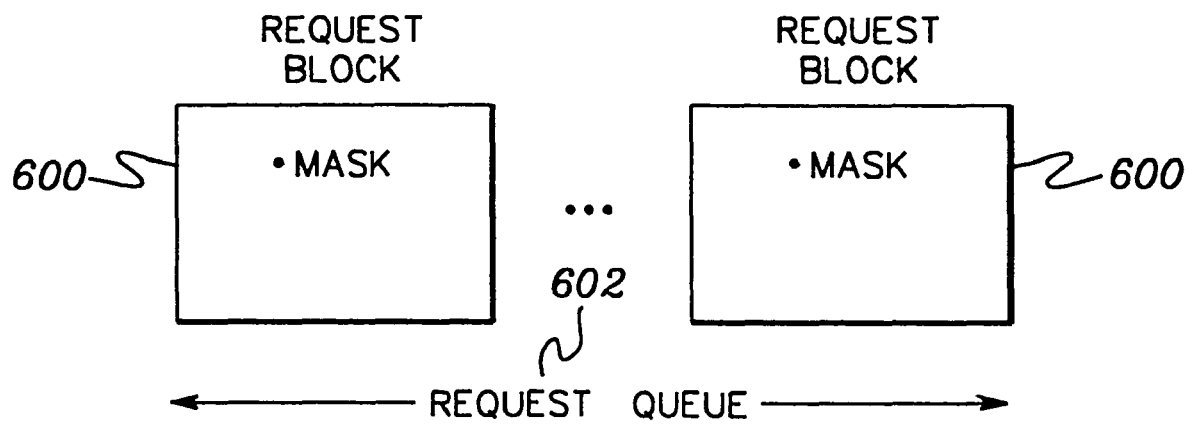
FIG. 6 depicts one embodiment of a request queue used in accordance with the principles of the present invention.

The asynchronous request is represented, in one embodiment, by a request data structure that includes information relating to the request. In one example, a request data structure 600 (FIG. 6) includes a mask of the thread pools that are eligible to service the request. For example, the mask includes a bit for each possible pool. Then, if the pool is eligible for processing, the bit is set on. If, however, the pool is not eligible for processing, then it is turned off.

One or more of the requests may be located on a request queue 602, which includes any client requests that could not be attached to a service thread, when it arrived at the server. (The request structure, as well as the other data structures described herein are protected by a main lock.)

Referring now to FIG. 4*b*, when a client request (also referred to as an SMB request or data) is received by the server, STEP 406, a Service Request Block (SRB) is scheduled by the operating system, which runs SRB code to dispatch the request to an available thread from an eligible pool (determined by the pool mask in the request), STEP 408. This SRB code does not do much processing at this time, since only the header portion has arrived. For instance, it does not examine the SMB to see what it is. It does, however, know the set of eligible pools. Thus, it checks the eligible pools (in order, as one example) and dispatches the request onto an available service thread of an eligible pool or puts the request on a global queue (e.g., the request queue), if all threads are busy.

Figure 7:
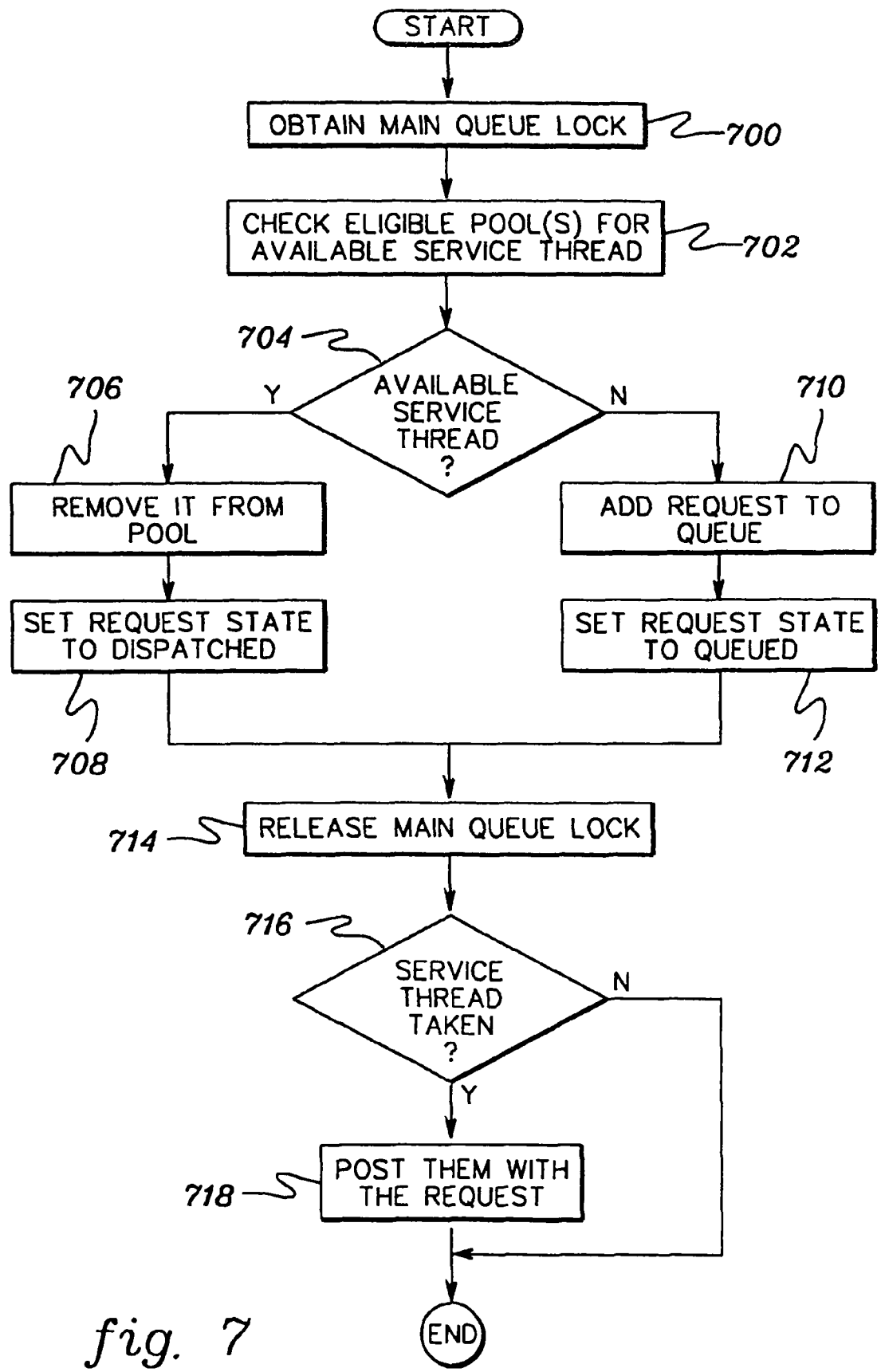
FIG. 7 depicts one embodiment of the logic associated with scheduling a Service Request Block, in accordance with the principles of the present invention.

Further details associated with one embodiment of the SRB logic are described with reference to FIG. 7. The SRB logic receives as input an address of the request block, which contains the relevant information about the request, including the pool mask.

Initially, a main lock is obtained for the request queue, STEP 700. This lock allows information in the pool mask to be retrieved without being concerned that the information can simultaneously be changed, STEP 700. Then, an eligible pool of the pool mask is selected and checked for an available service thread, STEP 702. In one example, the pool to be checked is selected based on pool order. For instance, the primary pool is first checked and then the secondary pool (or other pools), if necessary. This makes it less likely that requests are processed on the secondary pool, and hence, less likely that a redispatch (described below) will be necessary.

If an available service thread is located, INQUIRY 704, then the service thread is removed from the pool, STEP 706, and the state of the request is set to Dispatched, STEP 708. This state indicates that the request was given to a service thread. Other states associated with a request include New indicating that the request has been sent to the system at some undetermined time (an SRB will be scheduled when data is available); Queued indicating that the request is on the request queue; Complete specifying that the request completed successfully; Failed indicating that the request failed; and Cancelled indicating that the request was cancelled.

If there was no available service thread, INQUIRY 704, then the request is added to the request queue, STEP 710, and the state of the request is set to Queued, STEP 712.

After dispatching or queuing the request, the main lock for the request queue is released, STEP 714. Subsequently, a determination is made as to whether a service thread was taken from the pool in STEP 706, STEP 716. If so, then POST processing is performed to dispatch the request on the processor on the available service thread, STEP 718. Thereafter, or if a service thread was not taken, then processing of the SRB is complete.

Subsequent to scheduling the Service Request Block, the request is processed, assuming that the request state was set to Dispatched by the SRB code. One example of this processing is described with reference to FIGS. 4c-4d.

Figure 4C:
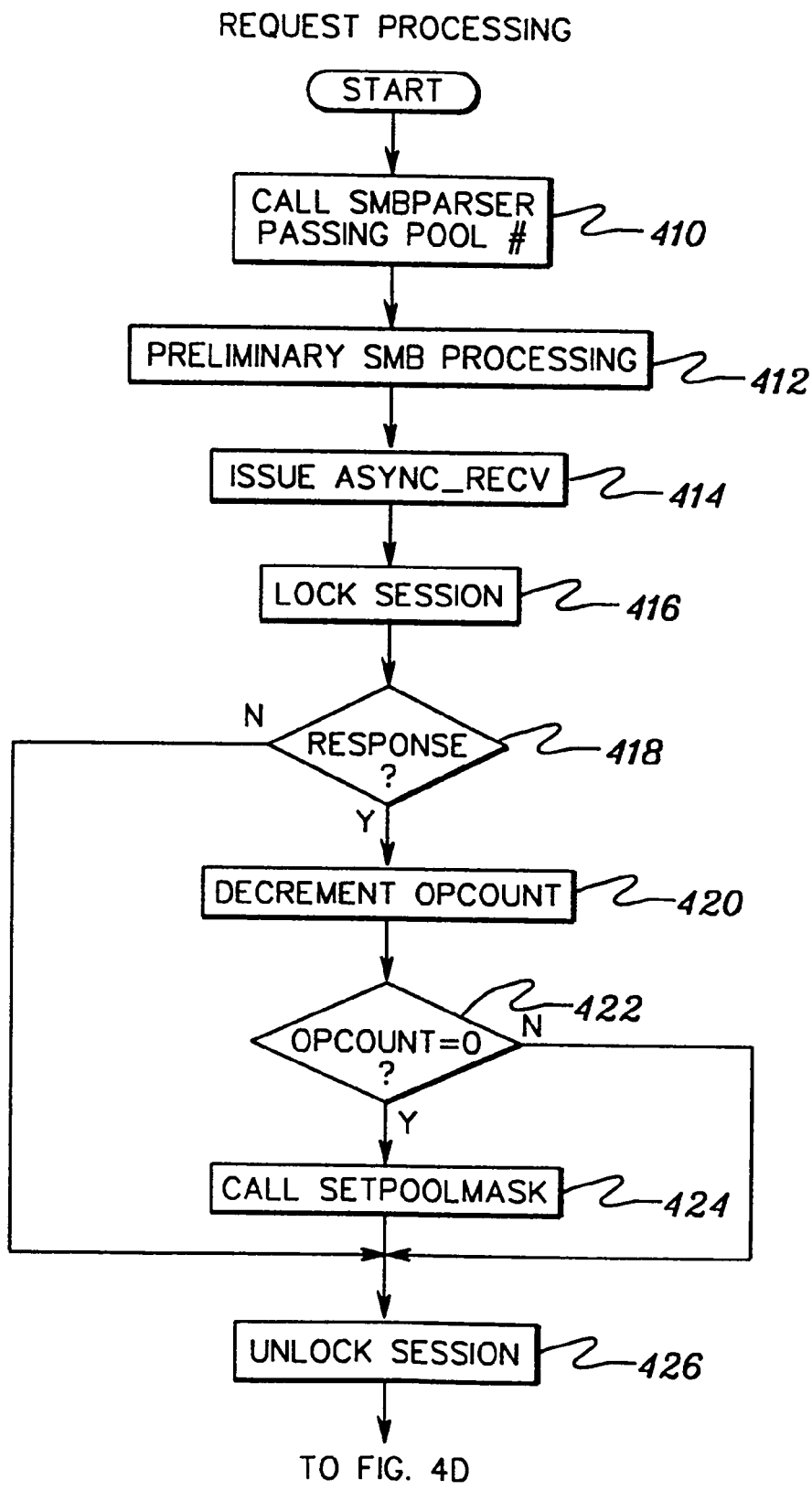
FIGS. 4c-4d depict one embodiment of the logic associated with processing requests, in accordance with the principles of the present invention.

At this point, the request is running on a service thread and the service thread knows its pool number. Thus, SMBparser is called via, for example, Netbios, which passes the pool number to SMBparser, STEP 410 (FIG. 4c). SMBparser performs some preliminary SMB processing, STEP 412, and another asynchronous receive function is issued to allow notification of the next request, STEP 414.

Additionally, processing continues for the request running on the service thread. Initially, the session associated with the client issuing the request is locked, STEP 416, and a determination is made as to whether the request is a callback response, INQUIRY 418. Should the request be a callback response, then the opcount is decremented, STEP 420, and a further determination is made as to whether the opcount is equal to zero, INQUIRY 422. If the opcount is zero indicating no further callback responses are needed, then setpoolmask is called to set the eligible thread pools to the primary pool, as one example, STEP 424. Thereafter, the session is unlocked, STEP 426.

Returning to INQUIRY 418, if this request is not a callback response or if the opcount is not equal to zero (INQUIRY 422), then setpoolmask is not called, at this time, and the session is unlocked, STEP 426.

Figure 4D:
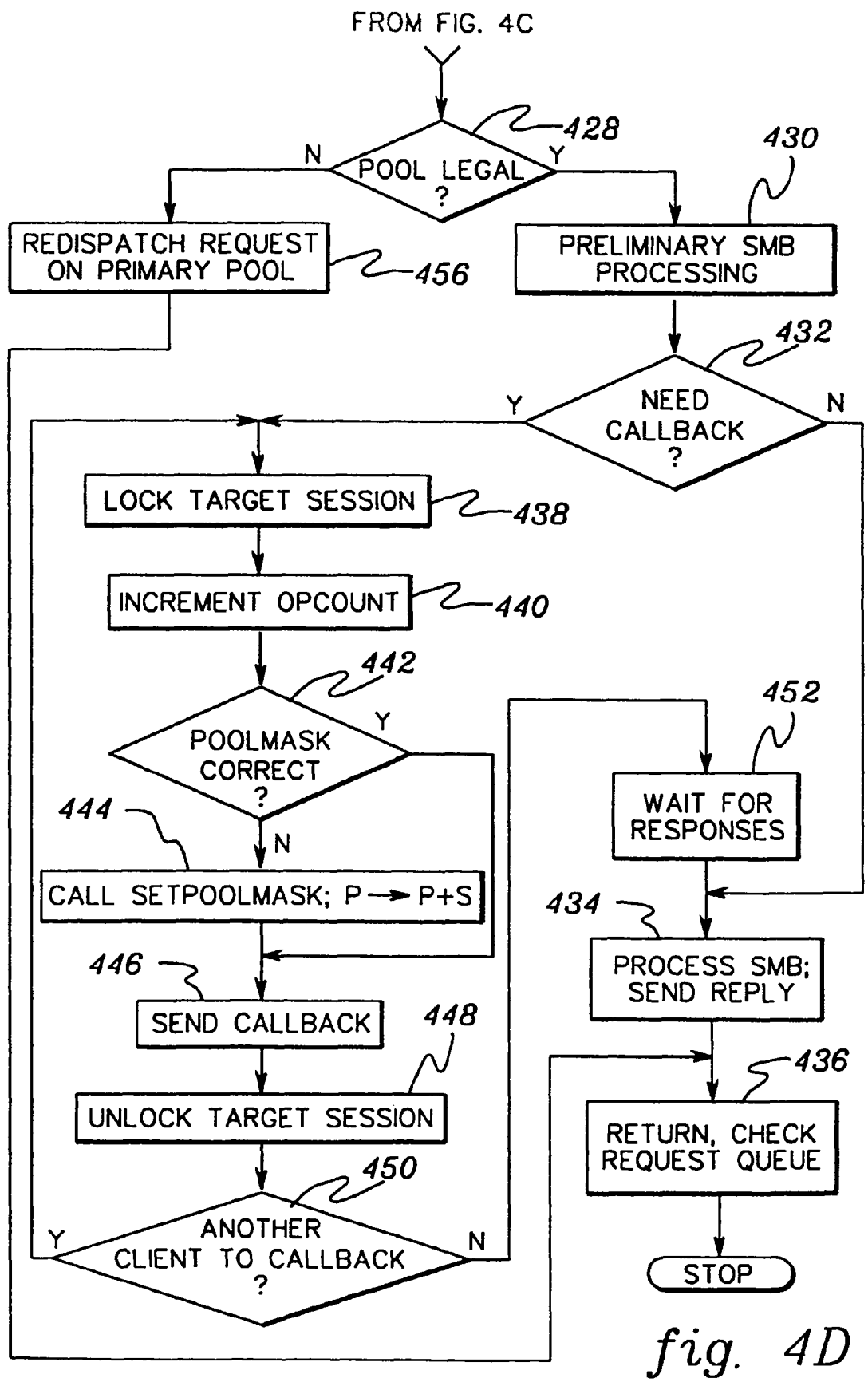

Subsequent to unlocking the session, a determination is made as to whether the pool associated with the thread servicing the request is legal, INQUIRY 428 (FIG. 4d). In particular, in one example, whenever a new SMB comes in, the pool number of the processing thread is passed from Async sockets to SMBparser, and the lower layers of SMBparser, as one example, examine the pool of the running thread to determine if it is legal. In one instance, the SMBparser checks to see whether the SMB is a request for a file that has an oplock held (i.e., is it a callback response). If the SMB is for an operation against an oplocked file, then it is eligible to be run on the secondary pool (it will not block because it already has an oplock) in addition to the primary pool. Any other SMB requests or requests for non-oplocked files are run only on the primary pool, in one example.

Thus, if the pool is legal, INQUIRY 428, then the SMB is processed on the thread, STEP 430. Thereafter, a determination is made by, for instance, the SMBparser layer, as to whether a callback to one or more other clients (or the same client) is needed in order to obtain information desired or needed by the processing request. In other words, will the request need to wait for one or more callback responses, INQUIRY 432.

If a callback is not needed, then the request is simply processed to completion (i.e., successful completion, failed, cancelled) on the thread selected earlier, and a reply is sent to the requesting client, STEP 434. Subsequently, the request queue is checked to see if other requests are eligible to be processed, STEP 436.

However, if a callback to one or more other clients (or the same client) is needed, then a session associated with one of the clients to receive the callback is locked, STEP 438, and the opcount is increased indicating an outstanding response, STEP 440. Additionally, a determination is made as to whether the current poolmask (indicated in the request block) is correct, INQUIRY 442. That is, a determination is made as to whether the poolmask reflects that both the primary and secondary thread pools are eligible for use.

If the poolmask already indicates that both the primary and secondary thread pools are eligible to be used, then the setpoolmask function does not need to be called. However, if the poolmask is not correct, then the setpoolmask function is performed in order to dynamically change the set of eligible thread pools for the client to receive the callback and to send the callback response, STEP 444. In particular, the setpoolmask function is issued to allow the next requests (e.g., the callback responses) to be processed by one of a plurality of pools.

The setpoolmask function can dynamically change the eligible pools of an outstanding request without cancelling the request or without extra dispatching of the request. However, as described below, there is a race condition inherent in the processing. That is, by the time setpoolmask is presented to Async sockets (the Async sockets code includes the setpoolmask code, in one instance), it may be too late to alter the set of eligible pools or the data could be coming in right at the time setpoolmask is called. Thus, further action is taken, as described below.

Figure 8:
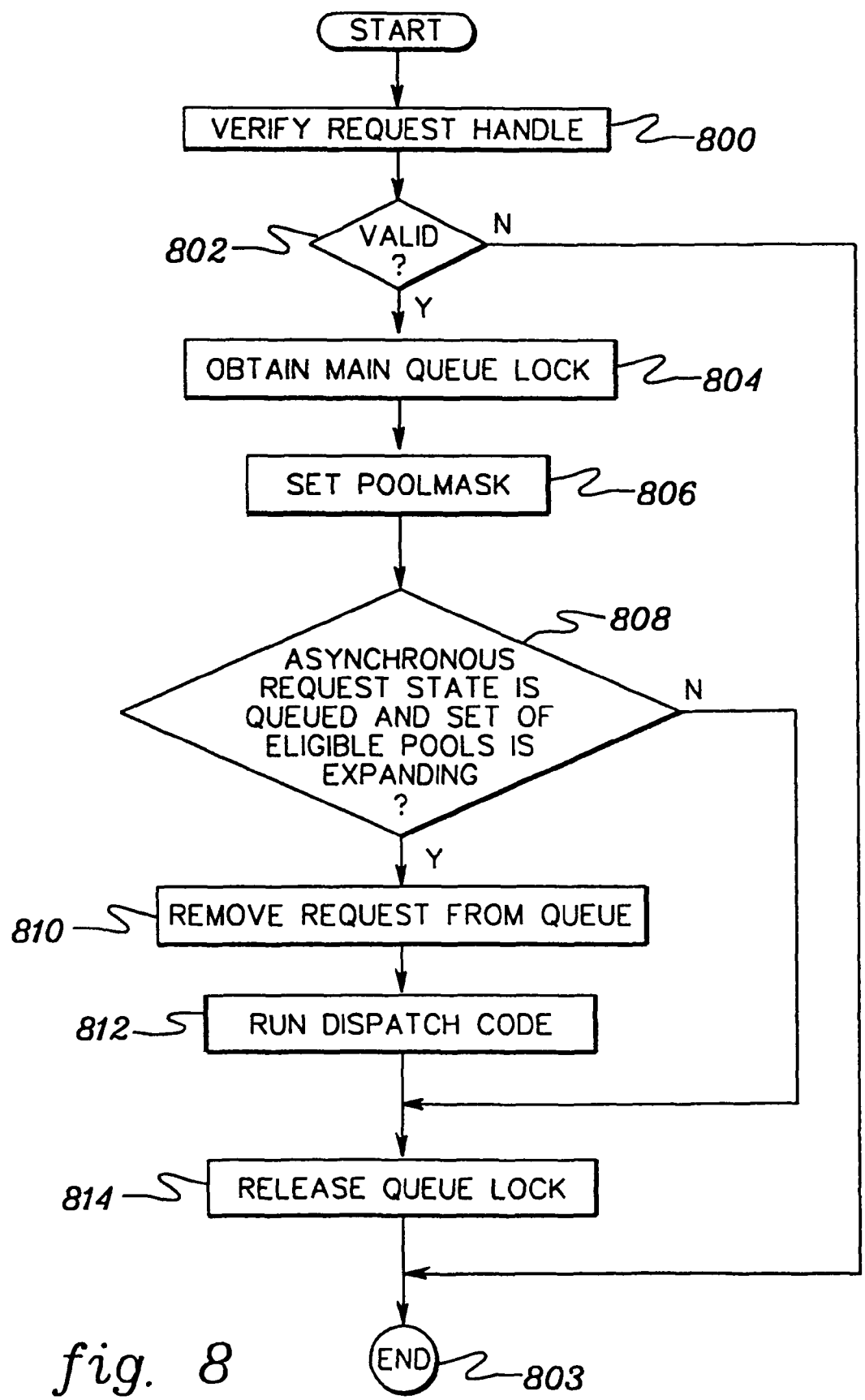
FIG. 8 depicts one embodiment of the logic associated with dynamically changing the set of eligible pools to be used in processing requests, in accordance with the principles of the present invention.

One embodiment of the logic associated with the setpoolmask capability is described with reference to FIG. 8. As described above, the setpoolmask code is called by SMBparser or Netbios when, for instance, it is determined that the request is waiting for a response, and more particularly, in one example, before a callback is to be issued to a client. Input to the setpoolmask code is an address of the request block with the relevant information and the new pool mask to be used (e.g., primary pool and secondary pool), as determined by the server.

Initially, a verification is performed of the request handle obtained from the request block corresponding to the request to ensure its validity, STEP 800. If it is invalid, INQUIRY 802, then processing of the setpoolmask function is complete, STEP 803. However, if it is valid, then the main lock of the request queue is obtained, STEP 804.

Subsequently, the pool mask in the appropriate request block is set to the input pool mask, STEP 806. Next, a determination is made as to whether the asynchronous request state is queued and whether the set of eligible pools is expanding, INQUIRY 808. That is, a determination is made as to whether the eligible pool list has changed. If the request is queued and the set of eligible pools has changed, then the request is removed from the queue, STEP 810, and the dispatch code is run to determine if the request could be processed by any of the new additional pools (to avoid deadlock), STEP 812. If it can, then a new pool is selected; if not, it is put back on the queue.

Returning to INQUIRY 808, if the asynchronous request is queued, but the set of pools is not expanding, then no action is taken and the race to change the set of eligible pools before the callback response is dispatched on the same pool waiting for the response (thereby causing a deadlock) may have been lost. That is, setpoolmask tries to honor the request, but it may be too late in some cases (response may already be dispatched).

After running the dispatch code or if the set of pools is not expanding, the main lock for the request queue is released, STEP 814, and the processing of setpoolmask is complete, STEP 803.

Since setpoolmask cannot guarantee that the setpoolmask request to change the set of eligible pools can be honored, for each SMB that is dispatched, the Asynchronous sockets layer passes the number of the pool corresponding to the running thread (i.e., thread of the SMB) to the upper layers (e.g., Netbios and SMBparser layers). Using this information (e.g., pool number), these layers make a determination as to whether the request should be redispatched to avoid a deadlock. In particular, these layers determine whether the pool is legal, as described above.

Returning to FIG. 4d, subsequent to setting the poolmask, a callback is issued to the client having the desired information, STEP 446. Thereafter, the target session of that client is unlocked, STEP 448, and a determination is made as to whether there are any other clients to callback, INQUIRY 450. This determination is made by, for instance, checking the oplocks for other clients.

When there are more clients to callback, processing continues with STEP 438, as described above. However, when there are no more outstanding callbacks, the service thread is put into a wait state (i.e., it goes idle and is ineligible for dispatch) until all of the responses come back, STEP 452. Thereafter, the SMB is processed, and the reply is sent to the requesting client, STEP 434. Additionally, the request queue is checked to determine if there is another eligible request on the request queue to be processed, STEP 436.

Returning to INQUIRY 428, if it is determined that the pool is illegal, then the request cannot be processed on the thread currently servicing the request. Thus, the lowest SMB parser layers, as one example, return a special return code to Netbios. Netbios then calls Async sockets to redispatch the request onto an eligible pool, which is the primary pool in this example, STEP 456. Netbios returns to Async sockets, which makes the running thread available to the pool. Hence, it could be that due to race conditions, requests unrelated to the callback come in that require redispatch from the secondary pool to the primary pool.

It should be noted that although a redispatch can be expensive in terms of CPU, it typically does not happen. The race is usually won by setpoolmask, which simply sets the mask and future requests come in on the appropriate pool(s). Clients usually respond to an oplock immediately, so unless a client request has come in coincidently when an oplock break is sent out and there are no available main pool threads, no redispatch is necessary. Also, in general, the main thread pool is set large relative to the secondary pool (the secondary pool is there, in one example, just to avoid deadlock). Thus, most requests, even oplock break responses, are simply processed on the primary pool, which does not require redispatch. Thus, in a large majority of the oplock break cases, changing the pool selection results in the setting of a bit mask (e.g., a machine word) and no redispatching is necessary resulting in a very efficient scheme. Only the lowest layer of the SMBparser component needs to deal with redispatch. The higher layers in the SMBparser, along with the layers above that (e.g., the file system interface and the opportunistic lock handling code) do not need to worry about what pool the request is running on, redispatch, or anything else related to this scheme.

Described in detail above is one embodiment of a pool management capability that allows the dynamic setting of eligible pools to be used to process requests. The set of pools is dynamically changed in order to avoid deadlock situations, especially when a client request is waiting for a callback response from one or more other clients.

In one aspect of the present invention, a dual pool solution is provided that handles thread pool assignment dynamically with no indication from the client request which pool it can use. The dynamic pool assignment mechanism is efficient and can be used in a variety of computing environments, including, but not limited to, any client/server environments, where client requests might need to block on responses from other clients.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing thread pools of a computing environment, the method comprising:
    selecting, from a plurality of thread pools, a set of eligible thread pools to which incoming requests from a client are to be dispatched for processing, the set of eligible thread pools comprising at least one primary thread pool and at least one supplemental thread pool, the at least one supplemental thread pool being included in the set of eligible thread pools responsive to at least one callback response being expected from the client and to facilitate avoiding deadlock;
    receiving a request from the client and dispatching the request to a thread pool of the set of eligible thread pools, wherein the dispatching is performed without any indication from the client of which thread pool is to be used for processing the request;
    responsive to the thread pool to which the request was dispatched being a supplemental thread pool of the at least one supplemental thread pool, dynamically determining whether to redispatch the request from the supplemental thread pool to a primary thread pool of the set of eligible thread pools, wherein the dynamically determining comprises determining whether the request comprises the callback response expected from the client; and responsive to determining that the request does not comprise the callback response expected from the client, redispatching the request from the supplemental thread pool to a primary thread pool of the at least one primary thread pool of the set of eligible thread pools for the client, to facilitate avoiding deadlock.

2. The method of claim 1, wherein the redispatching dispatches the request to the primary thread pool, and wherein the method further comprises processing the request using a thread of the primary thread pool.

3. The method of claim 1, wherein responsive to determining that the request does comprise the callback response expected from the client, the method further comprises processing the request using a thread of the supplemental thread pool.

4. The method of claim 1, wherein the at least one supplemental thread pool is dynamically included in the set of eligible thread pools for the client responsive to the callback response being expected from the client.

5. The method of claim 4, further comprising dynamically excluding the at least one supplemental thread pool from the set of eligible thread pools for the client responsive to the callback response not being expected from the client.

6. The method of claim 1, wherein the at least one supplemental thread pool is dynamically included in the set of eligible thread pools for the client responsive to a callback request being sent to the client.

7. The method of claim 6, wherein the callback response is in response to the callback request sent to the client.

8. The method of claim 1, wherein the selecting comprises including the at least one supplemental thread pool in the set of eligible thread pools for the client responsive to a callback request being issued to the client.

9. The method of claim 1, wherein the method further comprises, responsive to determining that the response comprises a callback response, decrementing a count of the callback responses expected from the client.

10. The method of claim 9, further comprising determining, subsequent to the decrementing, whether the decremented count of callback responses expected from the client is equal to zero, and responsive to the count of callback responses expected from the client being zero, reselecting the set of eligible thread pools for the client, wherein the reselecting excludes the at least one supplemental thread pool from the set of eligible thread pools for the client.

11. A computer system for managing thread pools of a computing environment, the computer system comprising:
a memory; and
a processor, in communications with the memory, wherein the computer system is configured to perform a method comprising:
selecting, from a plurality of thread pools, a set of eligible thread pools to which incoming requests from a client are to be dispatched for processing, the set of eligible thread pools comprising at least one primary thread pool and at least one supplemental thread pool, the at least one supplemental thread pool being included in the set of eligible thread pools responsive to at least one callback response being expected from the client and to facilitate avoiding deadlock;
receiving a request from the client and dispatching the request to a thread pool of the set of eligible thread pools, wherein the dispatching is performed without any indication from the client of which thread pool is to be used for processing the request;
responsive to the thread pool to which the request was dispatched being a supplemental thread pool of the at least one supplemental thread pool, dynamically determining whether to redispatch the request from the supplemental thread pool to a primary thread pool of the set of eligible thread pools, wherein the dynamically determining comprises determining whether the request comprises the callback response expected from the client; and
responsive to determining that the request does not comprise the callback response expected from the client, redispatching the request from the supplemental thread pool to a primary thread pool of the at least one primary thread pool of the set of eligible thread pools for the client, to facilitate avoiding deadlock.

12. The computer system of claim 11, wherein the at least one supplemental thread pool is dynamically included in the set of eligible thread pools for the client responsive to a callback request being sent to the client, and wherein the callback response is in response to the callback request sent to the client.

13. The computer system of claim 11, wherein the selecting comprises including the at least one supplemental thread pool in the set of eligible thread pools for the client responsive to a callback request being issued to the client.

14. The computer system of claim 11, wherein, responsive to determining that the response comprises the callback response, the method further comprises:
decrementing a count of callback responses expected from the client;
determining, subsequent to the decrementing, whether the decremented count of callback responses expected from the client is equal to zero; and
responsive to the count of callback responses expected from the client being zero, reselecting the set of eligible thread pools for the client, wherein the reselecting excludes the at least one supplemental thread pool from the set of eligible thread pools.

15. A computer program product for managing thread pools of a computing environment, the computer program product comprising:
a tangible storage medium readable by a processor and storing instructions for execution by the processor for performing a method comprising:
selecting, from a plurality of thread pools, a set of eligible thread pools to which incoming requests from a client are to be dispatched for processing, the set of eligible thread pools comprising at least one primary thread pool and at least one supplemental thread pool, the at least one supplemental thread pool being included in the set of eligible thread pools responsive to at least one callback response being expected from the client and to facilitate avoiding deadlock;
receiving a request from the client and dispatching the request to a thread pool of the set of eligible thread pools, wherein the dispatching is performed without any indication from the client of which thread pool is to be used for processing the request;
responsive to the thread pool to which the request was dispatched being a supplemental thread pool of the at least one supplemental thread pool, dynamically determining whether to redispatch the request from the supplemental thread pool to a primary thread pool of the set of eligible thread pools, wherein the dynamically determining comprises determining whether the request comprises the callback response expected from the client; and responsive to determining that the request does not comprise the callback response expected from the client, redispatching the request from the supplemental thread pool to a primary thread pool of the at least one primary thread pool of the set of eligible thread pools for the client, to facilitate avoiding deadlock.

16. The computer program product of claim 15, wherein the at least one supplemental thread pool is dynamically included in the set of eligible thread pools for the client responsive to a callback request being sent to the client, and wherein the callback response is in response to the callback request sent to the client.

17. The computer program product of claim 15, wherein the selecting comprises including the at least one supplemental thread pool in the set of eligible thread pools for the client responsive to a callback request being issued to the client.

18. The computer system of claim 15, wherein, responsive to determining that the response comprises the callback response, the method further comprises:

decrementing a count of callback responses expected from the client;

determining, subsequent to the decrementing, whether the decremented count of callback responses expected from the client is equal to zero; and responsive to the count of callback responses expected from the client being zero, reselecting the set of eligible thread pools for the client, wherein the reselecting excludes the at least one supplemental thread pool from the set of eligible thread pools.

\* \* \* \* \*